W. E. HEILLE.
DEVICE FOR KILLING FLIES.
APPLICATION FILED AUG. 26, 1913.
1,111,579. Patented Sept. 22, 1914.
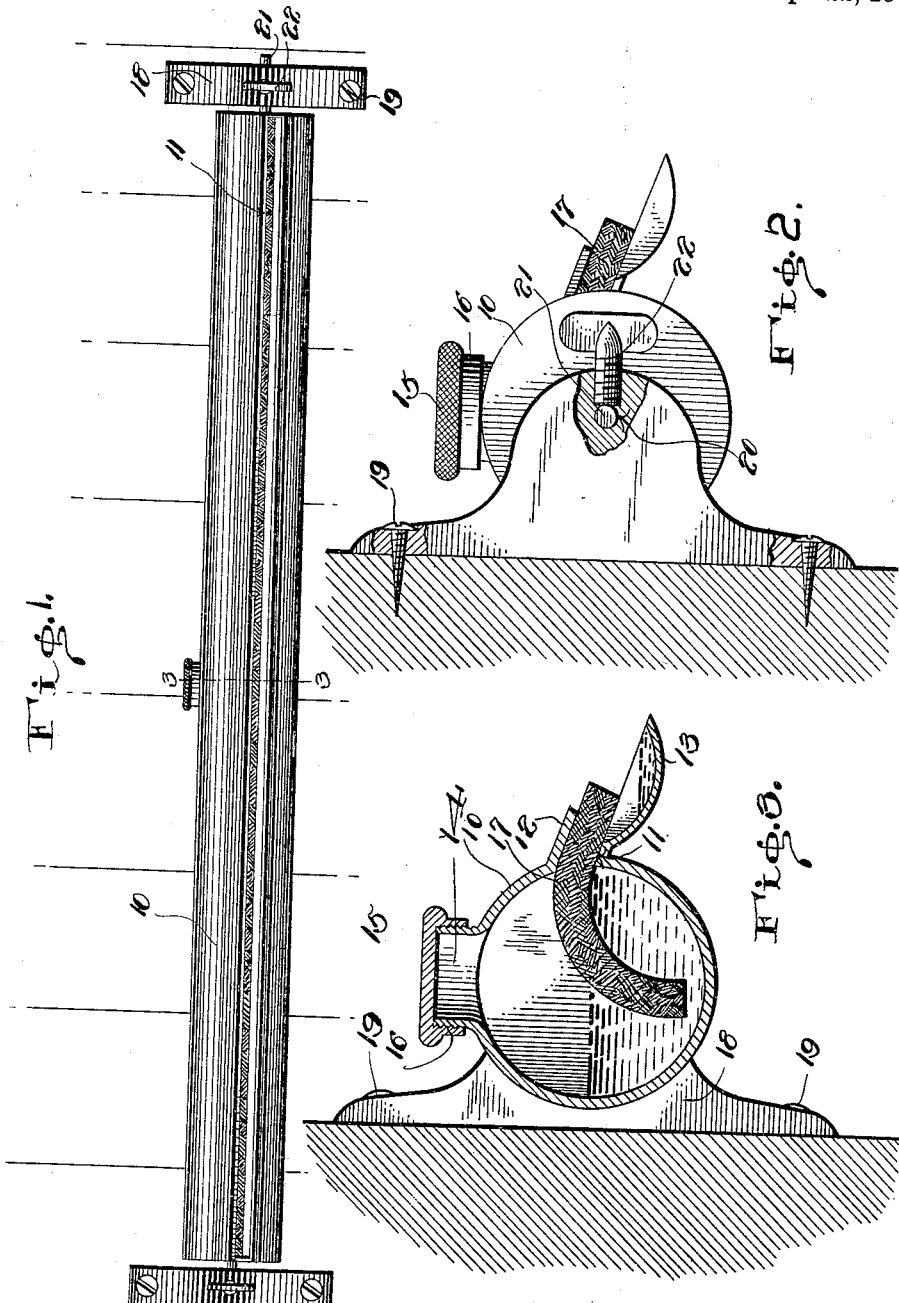
Witnesses
Howard F. Costello
Wade Koontz
Inventor
William E. Heille
By E. E. Vrooman,
Attorneys.

UNITED STATES PATENT OFFICE.

WILLIAM E. HEILLE, OF CASSELTON, NORTH DAKOTA.

DEVICE FOR KILLING FLIES.

1,111,579.  Specification of Letters Patent.  Patented Sept. 22, 1914.

Application filed August 26, 1913. Serial No. 786,643.

*To all whom it may concern:*

Be it known that I, WILLIAM E. HEILLE, a citizen of the United States, residing at Casselton, in the county of Cass and State of North Dakota, have invented certain new and useful Improvements in Devices for Killing Flies, of which the following is a specification, reference being had therein to the accompanying drawing.

This invention relates to an insect exterminator and has for its object the production of an insect exterminator that can be placed out of the way of children.

Another object of this invention is the production of a novel wick guiding means for this insect exterminator.

With these and other objects in view this invention consists of certain novel combinations, constructions and arrangements of parts as will be hereinafter fully described and claimed.

In the accompanying drawing:—Figure 1 is a front elevation of the improved fly exterminator showing the same mounted on a support. Fig. 2 is an end view of the exterminator mounted on a support. Fig. 3 is a section taken on the line 3—3 of Fig. 1.

Referring to the parts by reference numerals, 10 indicates an elongated cylindrical body having a longitudinally extending opening 11 formed therein. Carried by this cylindrical body 10 and positioned adjacent the upper edge of the aperture or opening 11 is a wick guiding flange 12, said wick guiding flange 12 is positioned parallel to a longitudinally extending trough 13 that is carried by the body 10 and positioned adjacent the lower edge of the aperture or opening 11. This longitudinally extending trough 13 is spoon-shaped in cross section, as shown in Fig. 3, to facilitate the placing of some fly attracting liquid therein. Positioned intermediate the length of the body 10 is an upstanding neck 14 that is provided with threads on its outer face. A cap 15 is provided with a downwardly extending collar 16, said collar 16 having threads on its inner face adapted to be screwed upon the neck 14. This neck 14 provides an opening through which the poison can be placed in the body or receptacle 10. This poison is adapted to saturate a wick 17, said wick passing through the opening 11 and extending between the flange 12 and the trough 13. This wick 17 is adapted to be positioned, as shown in Figs. 2 and 3 so that insects can light upon the trough 13 and have ready access to the poison saturated wick 17. To hold this body in a desired position there is provided bracket members 18 having securing means 19, said bracket members 18 provided with an aperture 20 through which the shafts 21 of the body 10 pass. An aperture extending at right-angles to the aperture 20 is formed in the bracket members 18 and the set-screw 22 is positioned therein to engage the shafts 21 to hold the body 10 in the desired position.

It is obvious that minor changes may be made in the form and construction of this invention without departing from the spirit thereof. It is therefore not wished to confine the invention to the exact form herein shown and described, but it is wished to include all such as properly come within the scope claimed.

What is claimed, is:—

1. An insect exterminator comprising a body, said body provided with an aperture, a flange positioned adjacent said aperture, a trough adjacent said aperture, a wick in said body positioned through said aperture and between said flange and said trough, and a poisonous liquid in said body adapted to saturate said wick.

2. A fly exterminator comprising a body, said body provided with a longitudinally extending slot, a longitudinally extending flange positioned adjacent the upper edge of said opening, a longitudinally extending trough positioned adjacent the lower edge of said opening, a wick in said body passing through said opening between said flange and said trough and a poisonous liquid in said body to saturate said wick.

3. An insect exterminator comprising a body, said body provided with a longitudinally extending slot, a flange at the upper edge of said slot, a trough formed at the lower edge of said slot, said trough being segmental in cross section to receive insect attracting means, a wick in said body and passing through said slot between said flange and said trough, and means for placing a poisonous liquid in said body to saturate said wick.

In testimony whereof I hereunto affix my signature in presence of two witnesses.

WILLIAM E. HEILLE.

Witnesses:
CLYDE A. SPELLMAN,
L. C. HONNELL.

Copies of this patent may be obtained for five cents each, by addressing the "Commissioner of Patents, Washington, D. C."